(12) United States Patent
Eberle et al.

(10) Patent No.: US 10,193,797 B2
(45) Date of Patent: Jan. 29, 2019

(54) TRIGGERED-ACTIONS NETWORK PROCESSOR

(71) Applicant: Oracle International Corporation, Redwood City, CA (US)

(72) Inventors: Hans Eberle, Mountain View, CA (US); Hagen W. Peters, Sunnyvale, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 522 days.

(21) Appl. No.: 14/707,856

(22) Filed: May 8, 2015

(65) Prior Publication Data

US 2016/0330109 A1 Nov. 10, 2016

(51) Int. Cl.
| | | |
|---|---|---|
| H04L 12/28 | (2006.01) | |
| H04L 12/725 | (2013.01) | |
| H04L 12/18 | (2006.01) | |
| H04L 12/58 | (2006.01) | |

(52) U.S. Cl.
CPC ...... *H04L 45/3065* (2013.01); *H04L 12/1804* (2013.01); *H04L 51/14* (2013.01)

(58) Field of Classification Search
None
See application file for complete search history.

(56) References Cited

U.S. PATENT DOCUMENTS

| | | | | |
|---|---|---|---|---|
| 7,899,030 B2* | 3/2011 | Mayhew | ............... | H04L 49/25 370/351 |
| 7,903,554 B1* | 3/2011 | Manur | ............... | H04L 45/026 370/230.1 |
| 8,176,242 B1* | 5/2012 | Shamis | ............... | G11C 15/00 365/49.1 |
| 9,471,316 B2 | 10/2016 | Eberle | | |
| 2002/0181396 A1* | 12/2002 | Chen | ............... | H04L 47/10 370/229 |
| 2003/0018808 A1* | 1/2003 | Brouk | ............... | G06Q 10/10 709/238 |
| 2003/0101169 A1* | 5/2003 | Bhatt | ............... | G06F 17/30569 |
| 2004/0015599 A1* | 1/2004 | Trinh | ............... | G06F 9/3885 709/232 |
| 2004/0223451 A1* | 11/2004 | Homma | ............... | H04J 3/085 370/228 |
| 2007/0011577 A1* | 1/2007 | Lattmann | ............... | H04L 45/00 714/763 |

(Continued)

*Primary Examiner* — Christopher T Wyllie
(74) *Attorney, Agent, or Firm* — Park, Vaughan, Fleming & Dowler LLP

(57) ABSTRACT

A network processor is described. This network processor determines a context for a message based on information in one or more fields in a payload of the message. For example, the context may be based on a message type and an identifier of the network connection on which the message was received. Then, the network processor calculates one or more trigger values based on one or more trigger expressions that perform checks on the information in the one or more fields. Moreover, the network processor determines one or more actions to be taken for the message based on the context and the one or more trigger values. In particular, the network processor determines whether the message is forwarded and one or more forwarding destinations.

16 Claims, 8 Drawing Sheets

(56) References Cited

U.S. PATENT DOCUMENTS

| | | | | |
|---|---|---|---|---|
| 2008/0161028 A1* | 7/2008 | Fonde | ................. | H04L 51/14 |
| | | | | 455/466 |
| 2014/0101751 A1* | 4/2014 | Lee | ................. | H04L 43/028 |
| | | | | 726/13 |
| 2014/0143854 A1* | 5/2014 | Lopez | ................. | H04L 63/0218 |
| | | | | 726/14 |
| 2015/0281092 A1* | 10/2015 | Benz | ................. | H04L 47/125 |
| | | | | 370/230 |
| 2015/0358290 A1* | 12/2015 | Jain | ................. | H04L 63/0263 |
| | | | | 711/108 |
| 2016/0164741 A1* | 6/2016 | Durgin | ................. | H04L 41/0836 |
| | | | | 370/255 |
| 2016/0197832 A1* | 7/2016 | Barry | ................. | H04L 45/7453 |
| | | | | 370/329 |

* cited by examiner

TRIGGERED-ACTIONS NETWORK PROCESSOR

BACKGROUND

Field

The present disclosure relates to a network processor for processing messages based on their context and payload information.

Related Art

A message gateway can be used to process incoming messages. For example, a message gateway can be used to route messages to different destinations. However, in some applications the processing of types of messages may involve a number of constraints.

For example, in a message gateway used to process messages with instructions from brokers and dealers for transactions on a stock exchange, regulatory requirements sometimes mandate that the number of stocks traded for a given stock and/or the financial amounts of a given trade should be bounded. However, the message gateway may need to process, on average, a very large number of messages per second, and any delay in this processing may have negative consequences. For example, if the latency is too large, the stock price may change such that the broker or dealer misses out on a trade. Consequently, the latency associated with processing a given message may need to be very short, e.g., on the order of microseconds. However, it may be difficult to achieve this design target while at the same time bounding the rates of the messages and/or the amounts of the trades for thousands of different stocks.

Hence, what is needed is a message gateway that processes messages without the above-described problems.

SUMMARY

The disclosed embodiments relate to the design of a network processor. This network processor includes an input network stack that receives messages from an inbound network link. The network processor also includes a format decoder that: extracts one or more fields from a given message; provides the one or more fields to application logic in the network processor; determines a context for the given message; and provides the given message and the context to a data handler in the network processor, where the context is based on a message type and an identifier of the network connection on which the given message was received. Next, the application logic: determines one or more trigger values based on the one or more fields and one or more trigger expressions; and then provides the one or more trigger values to the data handler, where the one or more trigger expressions include checks on information in a payload of the given message. Furthermore, the data handler determines one or more actions to be taken for the given message based on the context and the one or more trigger values, where the one or more actions to be taken include whether the given message is forwarded and one or more forwarding destinations.

In some embodiments, the format decoder: determines a message status for the given message; and provides the message status to the data handler, where the message status includes a length of the given message and information specifying any error conditions associated with the given message. Moreover, the data handler may determine the one or more actions to be taken based on the information specifying any error conditions associated with the given message.

Furthermore, the application logic may: determine a logic status based on the one or more fields; and provide the logic status to the data handler, where the logic status includes information specifying any error conditions associated with the application logic. Additionally, the data handler may determine the one or more actions to be taken based on the information specifying any error conditions associated with the application logic.

Note that the network processor may include multiple instances of the application logic that process multiple messages in parallel.

Moreover, the data handler may include a memory in which the context and the one or more trigger values specify an address that points to a memory location with the one or more actions to be taken. For example, the address may be determined by performing a logical operation on values in the context and the one or more corresponding trigger values. Furthermore, after the address is determined, the data handler may determine the one or more actions to be taken without executing instructions for additional logical operations. Note that a number of bits in the address may be dynamically set when instructions specifying the network processor are compiled.

In some embodiments, the one or more forwarding destinations include one of: an output network stack configured to provide at least a subset of the messages to an outbound network link; a message logger; and a processor.

Moreover, the given message may be processed without conditional statements.

Furthermore, the network processor may operate at a data rate of the inbound network link.

Additionally, the context may be determined by the format decoder using a look-up table based on the message type and the identifier of the network connection.

In some embodiments, the context from the format decoder, the one or more trigger values from the application logic, the message status from the format decoder and the logic status from application logic arrive at the data handler in order (i.e., these values from each of the functional units are synchronized). However, in some embodiments the format decoder delivers the one or more fields to the data handler and the application logic delivers the one or more trigger values to the data handler without synchronization.

Another embodiment provides a system (such as a message gateway) including: a processor; and the network processor coupled to the processor.

Another embodiment provides a method for processing messages, which may be performed by the network processor. During the method, the input network stack in the network processor receives the messages from the inbound network link. Then, the format decoder in the network processor: extracts the one or more fields from the given message; provides the one or more fields to the application logic in the network processor; determines the context for the given message, where the context is based on the message type and the identifier of the network connection on which the given message was received; and provides the given message and the context to the data handler in the network processor. The application logic: determines the one or more trigger values based on the one or more fields and the one or more trigger expressions, where determining the one or more trigger expressions involves determining the checks on the information in the payload of the given message; and provides the one or more trigger values to the data handler. Next, the data handler determines the one or more actions to be taken for the given message based on the context and the one or more trigger values, where the one or more actions to be taken include whether the given message is forwarded and the one or more forwarding destinations.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

Figure 1:
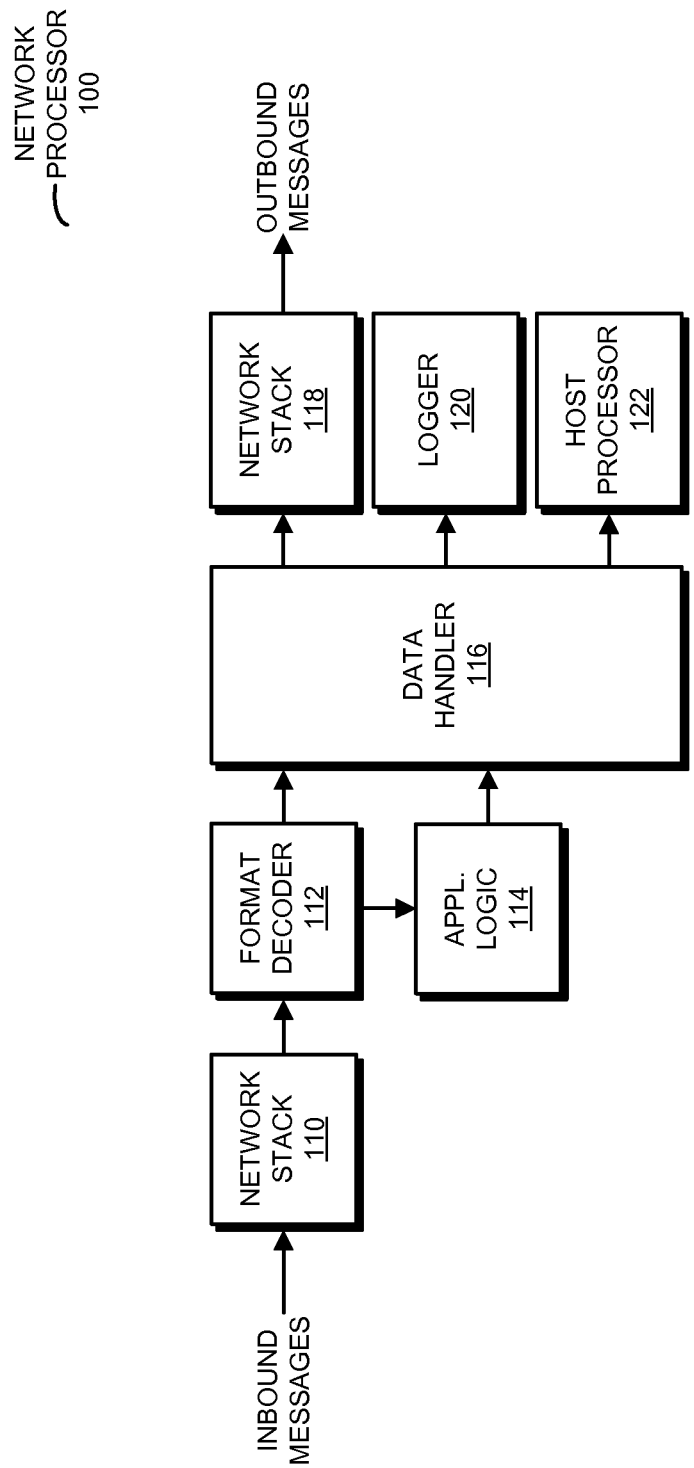
FIG. 1 is a block diagram illustrating a network processor in a message gateway in accordance with an embodiment of the present disclosure.

Table 1 provides pseudocode for a network processor in accordance with an embodiment of the present disclosure.

Table 2 provides pseudocode for a network processor in accordance with an embodiment of the present disclosure.

Table 3 provides an action map for a network processor in accordance with an embodiment of the present disclosure.

Table 4 provides an action map for a network processor in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a network processor, a system that includes the network processor (such as a message gateway), and a method for processing messages are described. The network processor determines a context for a message based on information in one or more fields in a payload of the message. For example, the context may be based on a message type and an identifier of the network connection on which the message was received. Then, the network processor calculates one or more trigger values based on one or more trigger expressions that perform checks on the information in the one or more fields. Moreover, the network processor determines one or more actions to be taken for the message based on the context and the one or more trigger values. In particular, the network processor determines whether the message is forwarded and one or more forwarding destinations.

The network processor may allow the message gateway to constrain or bound the number of stocks and/or financial amounts associated with the messages. For example, the messages may include stock transactions (such as a buy, a sell or a short transaction for one or more stocks), and the network processor may ensure that there are not too many stocks traded or that the trades do not involve financial amounts exceeding a threshold value as a function of time. In addition, these constraints may be applied based on a source of the messages (e.g., where the messages come from), so that the number of stocks traded and the associated financial amounts can vary depending on the privileges of the source. Moreover, the network processor may perform these functions at the network rate at which the messages are received. Furthermore, the network processor may have very low latency (such as latencies on the order of microseconds). This may allow the network processor to ensure regulatory compliance in latency-sensitive applications, such as stock trading.

We now describe embodiments of the network processor, which is sometimes referred to as a triggered Actions Network Processor (TANP). The TANP computes triggers from extracted message fields and then uses the triggers to determine the actions to be taken on the message. For example, in a message-gateway application, an action determines whether or not to forward a message to a network link and the forwarding action is triggered if a given message field is smaller than a threshold value. In this example, the trigger is set if a message field $t_i$ is less than a constant, and the action to forward the message is taken when the trigger is set.

The TANP architecture uses application logic to calculate the triggers and an action map to map the triggers together with other message-related context information to actions. In some embodiments, the application logic is implemented using the processor described in U.S. patent application Ser. No. 14/150,073, entitled "Multi-Move Single-Instruction Processor," by Hans Eberle and Hagen W. Peters, filed on Jan. 8, 2014, the contents of which are hereby incorporated by reference. In order to operate at network wire speed, multiple instances of the application logic may process multiple messages in parallel. The TANP enables a simple program execution model. In particular, messages may be processed in order. Thus, message-related 'results,' such as triggers and other context information may arrive at the action map in order, thereby eliminating the need for a reordering mechanism (which would be needed if partial results of multiple messages processed in parallel arrived at the action map out of order). Moreover, a message may be processed by a fixed number of sequentially executed instructions. Furthermore, instructions may be statically scheduled at compile time, and resource utilization and performance may be determined at the compile time. In addition, conflicts resulting from accesses to shared resources (such as tables) can be avoided by time-multiplexing the corresponding access operations (under control of the compiler).

FIG. 1 presents a block diagram illustrating a network processor 100 that is based on a triggered-actions architecture. This network processor includes an input network stack 110 that receives messages from an inbound network link. Network stack 110 may implement network protocols such as User Datagram Protocol or Transmission Control Protocol. From the network stack 110, frames containing one or more messages are forwarded to format decoder 112. Format decoder 112 may: delineate the messages; extract one or more fields from a payload in a given message; provide the one or more fields to application logic 114; determine a context for the given message; and provide the given message and the context to a data handler 116, where the context is based on a message type and an identifier of the network connection on which the given message was received. In addition, format decoder 112 may: determine a message status for the given message; and provide the message status to data handler 116, where the message status includes a length of the given message and information specifying any error conditions associated with the given message (such as 'unknown message type').

Upon receiving the one or more message fields of interest from format decoder 112, application logic 114 may: determine one or more trigger values based on the one or more fields and one or more trigger expressions; and provide the one or more trigger values to data handler 116, where the one or more trigger expressions include checks on information in a payload of the given message. In addition, application logic 114 may: determine a logic status based on the one or more fields; and provide the logic status to data handler 116, where the logic status includes information specifying any error conditions associated with application logic 114 (such as overflows or underflows of its functional units). As noted previously, network processor 100 may include multiple instances of application logic 114 that process multiple messages in parallel in order to keep up with the rate at which messages arrive from the network.

Based on the information received from format decoder 112 and application logic 114 (such as the messages, the context, the triggers, the message status and/or the logic status), data handler 116 may determine one or more actions to be taken for the given message based on the context, the one or more trigger values, the information specifying any error conditions associated with the given message and/or the information specifying any error conditions associated with application logic 114, where the one or more actions to be taken include whether the given message is forwarded and one or more forwarding destinations. For example, the one or more forwarding destinations may include an output network stack 118 configured to provide at least a subset of the messages to an outbound network link. Alternatively or additionally, the one or more forwarding destinations may include a message logger 120 and/or a host processor 122. Note that data handler 116 may serve as a single synchronization point that collects values from different functional units (such as the context from format decoder 112, the triggers from application logic 114, the message status from format decoder 112 and/or logic status from application logic 114) to then determine the actions to be taken on the message. (The context may include the message type, the location or connection identifier, etc., and the status may include metadata about the processing.)

In some embodiments, no triggers are calculated in application logic 114. Therefore, application logic 114 may be reduced to a 'pass-through' application logic 114 that contains no processing logic, and simply provides constant values for the logic status and the triggers.

Figure 2:
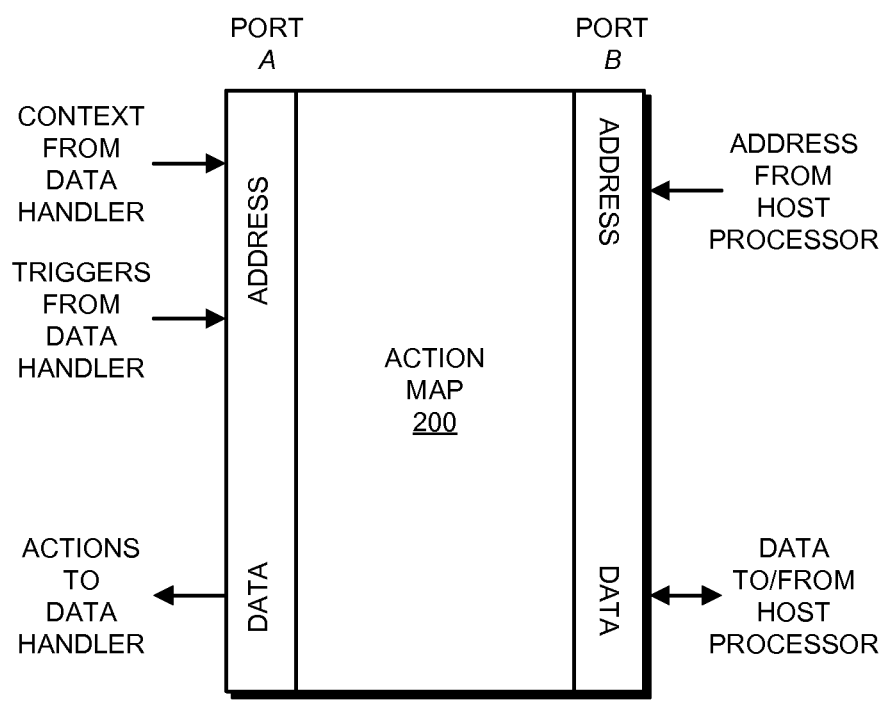
FIG. 2 is a block diagram illustrating an action map in the network processor of FIG. 1 in accordance with an embodiment of the present disclosure.

The core of data handler 116 is action map 200 shown in FIG. 2. This action map maps the context and the triggers to actions, e.g., using a look-up table. In some embodiments, action map 200 is implemented using a dual-port RAM in which one port (Port A) is coupled to the internals of data handler 116 (FIG. 1) and the other port (Port B) is coupled to a general-purpose host processor. Data handler 116 (FIG. 1) may use the combination of the context provided by format decoder 112 (FIG. 1) and the triggers generated by application logic 114 (FIG. 1) as the action-map address (which is sometimes referred to as an 'address') for action map 200. The resulting action-map address may point to a data word that represents the actions. Moreover, the host processor may use a separate port to initialize action map 200 with values generated by a compiler. This port can also be used to change values in the action map at runtime using values generated at runtime by the user code.

Using a memory for action map 200 allows for any arbitrary combinational function to be performed on the triggers and context. Furthermore, by using a memory for the mapping function, this operation is executed with little delay. An alternative implementation using Boolean instructions may take significantly more time. Consequently, after the action-map address is determined, data handler 116 may determine the one or more actions to be taken without executing instructions for additional logical operations.

As noted previously, actions may be determined by the context in addition to the triggers. The context may allow for partitioning action map 200 into several tables, each with its own mapping of triggers to actions. Note that the compiler may determine the context. For example, the context may be chosen to be one clause or a group of several on clauses (as described further below with reference to Tables 1 and 2). More generally, the context and the triggers may be input vectors that are logically OR'ed (or combined with one or more logical operations) together to obtain the action-map address in action map 200.

Figure 3:
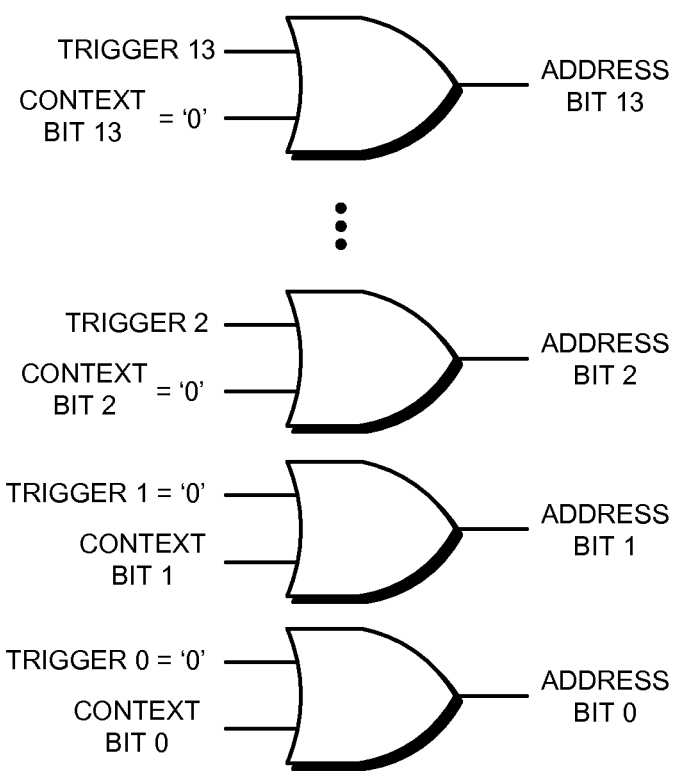
FIG. 3 is a drawing illustrating mapping from context and triggers to action-map address bits in the network processor of FIG. 1 in accordance with an embodiment of the present disclosure.

Note that the number of action-map address bits assigned to the context and the triggers, respectively, can be chosen either statically or dynamically. With static assignment, the assignment of the context bits and the trigger bits to the action-map address bits of action map 200 may be hardwired. Alternatively, with dynamic assignment, the number of action-map address bits and which action-map address bits are assigned to context and triggers, respectively, may be decided at compile time. In some embodiments, the context and the triggers are OR'ed together to form a 14-bit wide action-map address. For example, as shown in FIG. 3, which illustrates a mapping from context and triggers to action-map address bits in network processor 100 (FIG. 1), two action-map address bits may be allocated for the context and 12 action-map address bits may be allocated for the triggers. For example, contexts bits 2-13 may be assigned the constant value '0' and trigger bits 0 and 1 may be assigned the constant value '0' (which turns these bits off).

Figure 4:
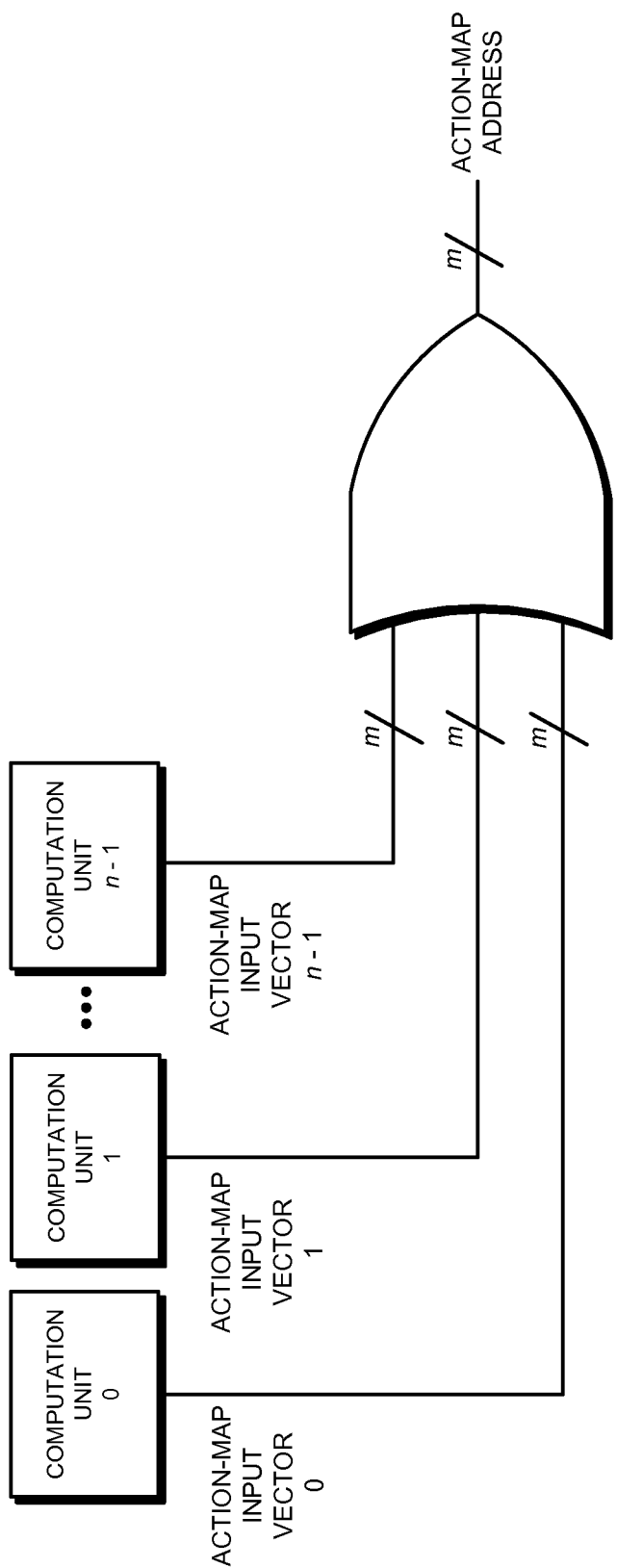
FIG. 4 is a drawing illustrating a generalized action-map address calculation in the network processor of FIG. 1 in accordance with an embodiment of the present disclosure.

In some embodiments, the context is obtained by a look-up table (in memory) in format decoder 112 (FIG. 1). This table may be indexed by the message type and the identifier of the network connection on which the message was received. The trigger values may be calculated by application logic 114 (FIG. 1) which then accumulates the results of the trigger expressions in a bit vector in a register. Moreover, the action-map address may be determined based on two input vectors, the context provided by format decoder 112 (FIG. 1) and the triggers provided by application logic 114 (FIG. 1). As shown in FIG. 4, which presents a drawing illustrating a generalized action-map address calculation in network processor 100 (FIG. 1), the action-map address calculation can be extended so that m-bit wide input vectors obtained from n computational units are OR'ed together to determine an m-bit wide action-map address.

Tables 1 and 2 illustrate two instances of pseudocode for the TANP, which are referred to as 'keyblets' KBLT0 and KBLT1. The keyblets include declarations of triggers and host callback functions, as well as the definition of the so-called handler (HDLR), i.e., the program that is executed on the TANP.

TABLE 1

```
keyblet KBLT0
import PRTL
trigger TRIG0 (binary PAR) {PAR < 10}
trigger TRIG1 (binary PAR) {PAR > 100}
proc_call CALL (binary PAR0, binary PAR1)
handler HDLR for PRTL {
  on 'TYPE0' {
    triggers:
      TRIG0 ('FLD0')
      TRIG1 ('FLD1')
    actions:
      route when (TRIG0 && TRIG1)
      CALL ('FLD0', 'FLD1') when (!TRIG0 || !TRIG1)
      log
  }
  on 'TYPE1' {
    triggers:
      TRIG0 ('FLD2')
      TRIG1 ('FLD3')
    actions:
      route when (!TRIG0 && !TRIG1)
      CALL ('FLD2','FLD3') when (TRIG0 || TRIG1)
      log
  }
}
```

TABLE 2

```
keyblet KBLT1
import PRTL
trigger TRIG0 (binary PAR) {PAR < 10}
trigger TRIG1 (binary PAR) {PAR > 100}
trigger TRIG2 (binary PAR) {PAR == 1000}
proc_call CALL (binary PAR0, binary PAR1, binary PAR2)
handler HDLR for PRTL {
  on 'TYPE0' {
    triggers:
      TRIG0 ('FLD0')
      TRIG1 ('FLD1')
      TRIG2 ('FLD2')
    actions:
      route when (TRIG0 && TRIG1 && TRIG2)
      CALL ('FLD0', 'FLD1', 'FLD2' ) when (!TRIG0 || !TRIG1 || !TRIG2)
      log
  }
}
```

The trigger section of the handler binds the message fields to the parameters of the triggers. Moreover, the format of the messages, more specifically, the field names and their positions in the message are specified in a separate imported protocol file (PRTL). The actions section specifies the actions taken based on the result of the evaluation of the triggers. Note that actions may specify how the messages are routed and, if they are routed to a host processor, what processor function to call. For example, possible actions may include: route, log, and call. Route and log are predefined actions that forward the message to the outbound network link and to the logging device, respectively. CALL specifies the call to be executed by the host processor. Declaring a processor call may implicitly create an action to forward the message to the host processor.

Keyblet KBLT0 in Table 1 defines a handler HDLR for imported protocol PRTL. This handler processes messages of two types, TYPE0 and TYPE1. KBLT0 also declares two triggers, TRIG0 and TRIG1. Both triggers take binary parameters as input and compare them with different constant values.

The handler in KBLT0 evaluates TRIG0 and TRIG1 for both message types TYPE0 and TYPE1. However, in case of TYPE0 the message is forwarded if both triggers are evaluated to true, while in case of TYPE1 the message is forwarded if both triggers are evaluated to false. Thus, the result vector {TRIG1, TRIG0} may be interpreted differently for different message types, i.e., different contexts. Table 3 provides the action map for keyblet KBLT0. The highest address bit $addr_2$ represents the two contexts, and the lower address bits $addr_1$ and $addr_0$ represent the results of the trigger evaluation.

TABLE 3

| $addr_2$ CTX | $addr_1$ TRIG1 | $addr_0$ TRIG0 | ACT(addr) ACTION |
|---|---|---|---|
| 0 | 0 | 0 | CALL, log |
| 0 | 0 | 1 | CALL, log |
| 0 | 1 | 0 | CALL, log |
| 0 | 1 | 1 | route, log |
| 1 | 0 | 0 | route, log |
| 1 | 0 | 1 | CALL, log |
| 1 | 1 | 0 | CALL, log |
| 1 | 1 | 1 | CALL, log |

On the other hand, the handler in keyblet KBLT1 in Table 2 uses three triggers (TRIG0, TRIG1 and TRIG2) but only handles messages of type TYPE0. Thus, the result vector {TRIG2, TRIG1, TRIG0} may be evaluated in the same context and the address bits $addr_2$, $addr_1$ and $addr_0$ represent the results of the trigger evaluation. Table 4 provides the action map for keyblet KBLT1.

TABLE 4

| $addr_2$ TRIG2 | $addr_1$ TRIG1 | $addr_0$ TRIG0 | ACT(addr) ACTION |
|---|---|---|---|
| 0 | 0 | 0 | CALL, log |
| 0 | 0 | 1 | CALL, log |
| 0 | 1 | 0 | CALL, log |
| 0 | 1 | 1 | CALL, log |
| 1 | 0 | 0 | CALL, log |
| 1 | 0 | 1 | CALL, log |
| 1 | 1 | 0 | CALL, log |
| 1 | 1 | 1 | route, log |

Figure 5:
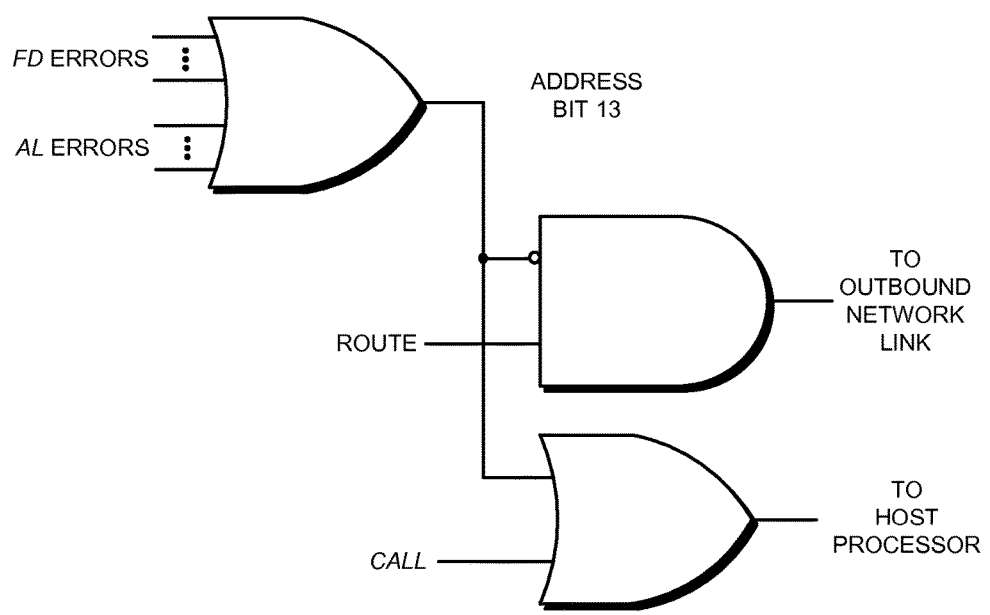
FIG. 5 is a drawing illustrating exception handling in the network processor of FIG. 1 in accordance with an embodiment of the present disclosure.

As noted previously, in some embodiments data handler 116 (FIG. 1) takes error conditions into account when determining the actions. This is shown in FIG. 5, which presents a drawing illustrating exception handling in network processor 100 (FIG. 1). In particular, an error reported by format decoder 112 (FIG. 1) and/or application logic 114 (FIG. 1) may modify the actions provided by the action map. In FIG. 5, the actions route and CALL (which were introduced in Table 1) are used. For example, if an error occurs, route is disabled and, with it, the message is not forwarded to outbound network stack 118 (FIG. 1). Alternatively, the occurrence of an error may force the message to be forwarded to the host processor independently of whether CALL is triggered or not.

Figure 6:
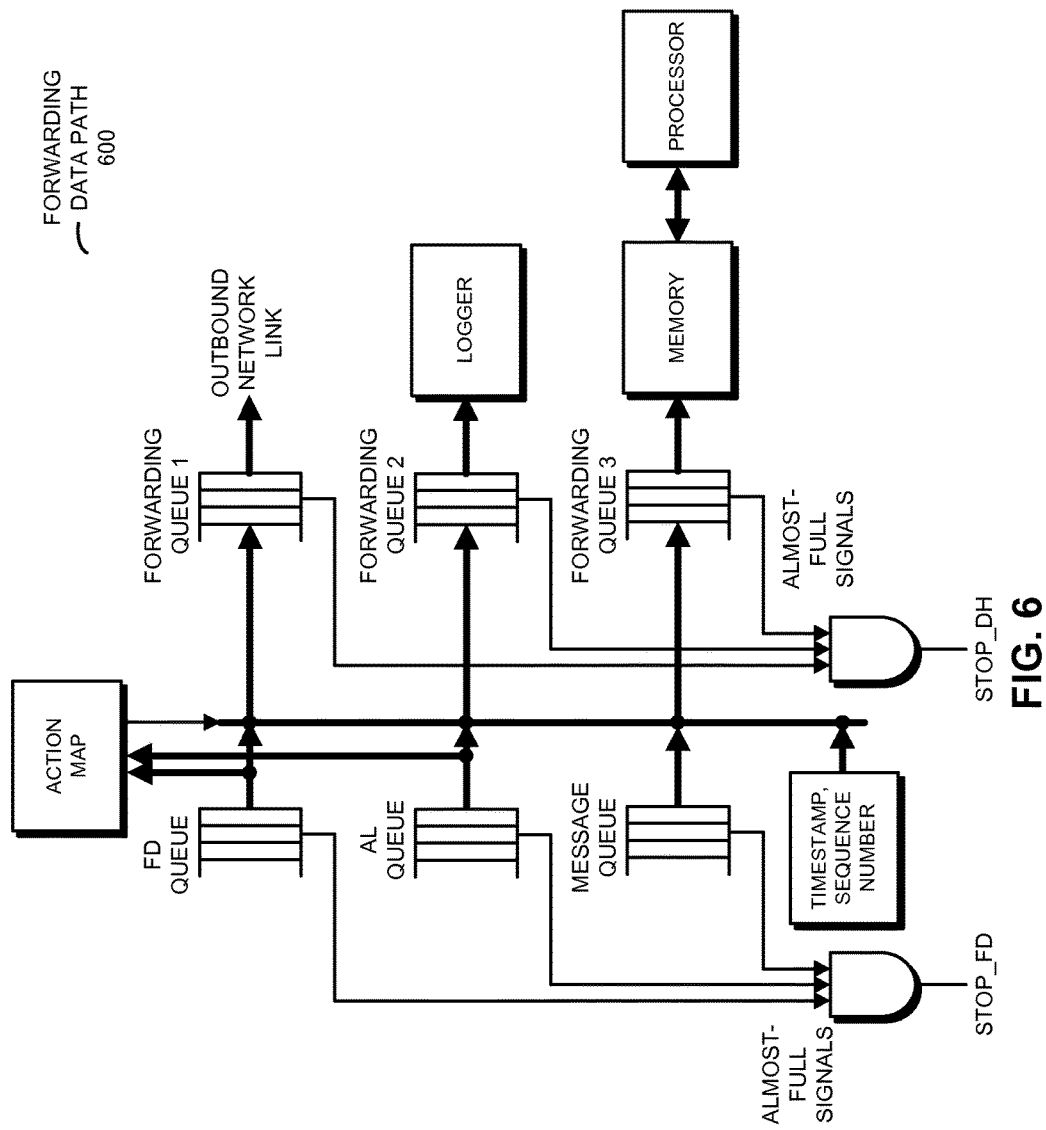
FIG. 6 is a drawing illustrating message forwarding in the network processor of FIG. 1 in accordance with an embodiment of the present disclosure.

Furthermore, data handler 116 (FIG. 1) may be considered to function as a router in that it takes a message and forwards it according to the actions and/or error conditions. An example of message forwarding in a forwarding data path 600 is shown in FIG. 6. In particular, a message is forwarded from the message queue (MQ) to the forwarding queues (FQs 1-3), where FQ1 is connected to the outbound network link, FQ2 to the logging device, and FQ3 to the host processor. Note that additional information (such as a status word, timestamp, or sequence number) may be prepended to the message. The status word may be supplied by format decoder 112 (FIG. 1) and/or application logic 114 (FIG. 1), and may be inserted into the format-decoder status queue (FD SQ) and application-logic status queue (AL SQ), respectively. This status word may include information such as: a message length, a message type, any error conditions, and trigger values.

Enqueuing data into the MQ and SQs may occur whenever data is made available by format decoder 112 (FIG. 1) or application logic 114 (FIG. 1). Note that synchronization between the queues may not be required. This may be possible because messages are processed in order, and because every message received may cause an entry to be enqueued into the MQ and the SQs. As soon as all three queues MQ, FD SQ, and AL SQ indicate that they are not empty, data handler 116 (FIG. 1) knows that a message is ready to be forwarded. Forwarding begins with a status word being read from each of the FD SQ and the AL SQ. If the message is forwarded to the outbound network link and/or the logging device, the message may be forwarded into the corresponding FQ. Moreover, if the message is forwarded to the logging device, a timestamp may be inserted into FQ2. And, if the message is forwarded to the processor, a sequence number may be inserted into FQ3. Furthermore, the message may be read from the MQ and forwarded to one or several FQs (as determined by the action map). The status words in the SQs may have a fixed size. Thus, no computation may be needed to dequeue the corresponding entries from the SQs. However, the message may have a variable size. Note that the size of the corresponding entry to be dequeued from the MQ may be determined by a length value contained in the status word supplied by format decoder 112 (FIG. 1).

While the TANP is designed to process messages at line rate, on occasion the receiver of the messages may not be able to keep up. For example, this may occur if transmission over the outbound network stops as a result of the receiver running out of buffer memory. While such occasions are assumed to be rare, the TANP may include mechanisms to ensure that data is not lost. In particular, a stop DH signal may be asserted when one of the FQs is about to become full. Stop DH may cause data handler 116 (FIG. 1) to stop forwarding any message (to any destination). If stop DH is not released quickly, the MQ or SQs will eventually fill up. To prevent overflow of these queues, a stop FD signal may be provided, which is asserted when the MQ or one of the SQs is nearly full. The stop FD signal may notify format decoder 112 (FIG. 1) to stop forwarding messages. Note that the fill level that triggers stop FD may be determined by the amount of data that has to be consumed by the queues before format decoder 112 (FIG. 1) stops forwarding messages. Similarly, when the buffer memories in the format decoder 112 (FIG. 1) become full, format decoder 112 (FIG. 1) may stop network stack 110 (FIG. 1).

In embodiments where the TANP supports multiple network connections, a separate set of queues for each network connection may be provided so that separate stop DH and stop FD signals are available for each network connection. In this approach, only the connection with the endpoint that cannot keep up may be stopped, while traffic can continue to flow through the other connections.

In an exemplary embodiment, the TANP is used in a message gateway. For example, the message gateway may connect stockbrokers or dealers with a stock exchange. This message gateway may perform compliance tests (such as SEC 15c3-5 pre-trade checks) on the messages received from the stockbroker via a network, and may forward the messages that pass the tests to the stock exchange via another or the same network. Note that there may be one or more compliance tests for different stock symbols, order types (such as buy, sell and short), and/or an identifier of a network connection on which a given message was received.

The TANP may enable a deterministic instruction execution model, i.e., it may statically schedule instruction execution and may determine when each instruction is executed at compile time. Consequently, conditional instruction execution to selectively compute triggers may not be supported. While the triggers may be calculated unconditionally, the triggers can be selectively considered when the actions are determined by the action map.

This execution model offers several advantages. For example, it may allow the compiler to determine at compile time whether there are sufficient application-logic units available to process messages at line rate. Moreover, the execution model may allow accesses to shared resources to be scheduled at compile time. Because it can be determined at compile time during which clock-cycles instructions are executed, accesses to shared resources (such as a hash table) can be time-multiplexed without requiring hardware mechanisms to detect and resolve conflicts at run-time. Furthermore, the execution model may make it easy to process messages in a fixed amount of time and thereby to process them in-order (which may be a requirement for a message-gateway application). Additionally, the execution model may provide a simple distributed computation model. In particular, as shown in FIG. 4, a generalized version of the TANP may collect action-map input vectors from several distributed functional units without synchronization between the functional units (i.e., the action-map input vectors resulting from processing a message can arrive in any order relative to each other). Instead, functional units may only be required to process messages and output the corresponding action-map input vectors in order. Data handler 116 (FIG. 1) may wait until each functional unit has contributed an action-map input vector before it uses that data to determine the actions.

Figure 7:
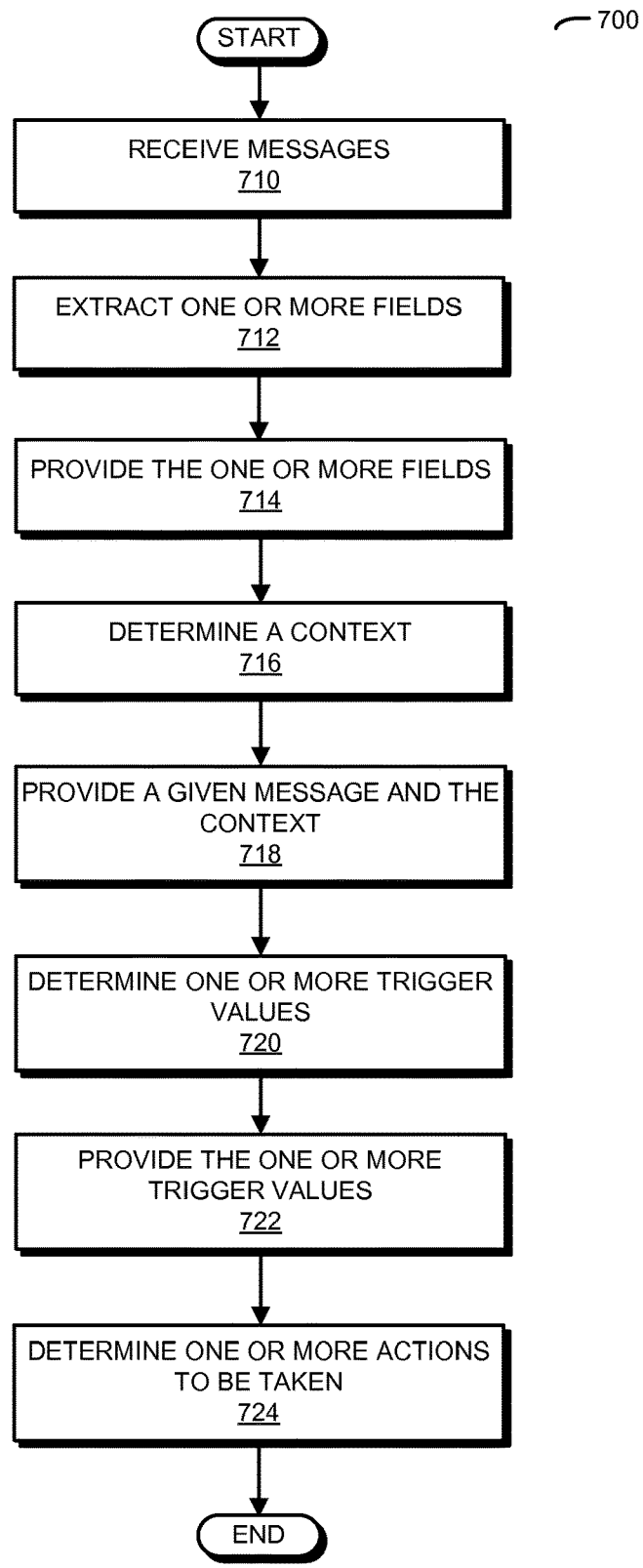
FIG. 7 is a flow diagram illustrating a method for processing messages in accordance with an embodiment of the present disclosure.

We now describe embodiments of the method. FIG. 7 presents a method 700 for processing messages that may be performed by a network processor, such as network processor 100 in FIG. 1. During operation, an input network stack in the network processor receives the messages (operation 710) from an inbound network link. Then, a format decoder in the network processor: extracts one or more fields (operation 712) from a given message; provides the one or more fields (operation 714) to application logic in the network processor; determines a context for the given message (operation 716), where the context is based on a message type and an identifier of a network connection on which the given message was received; and provides the given message and the context (operation 718) to a data handler in the network processor. Moreover, the application logic: determines one or more trigger values (operation 720) based on the one or more fields and the one or more trigger expressions, where the one or more trigger expressions include checks on information in a payload of the given message; and provides the one or more trigger values (operation 722) to the data handler. Next, the data handler determines one or more actions to be taken (operation 724) for the given message based on the context and the one or more trigger values, where the one or more actions to be taken include whether the given message is forwarded and one or more forwarding destinations.

In some embodiments of method 700, there are additional or fewer operations. Moreover, the order of the operations may be changed and/or two or more operations may be combined into a single operation.

Figure 8:
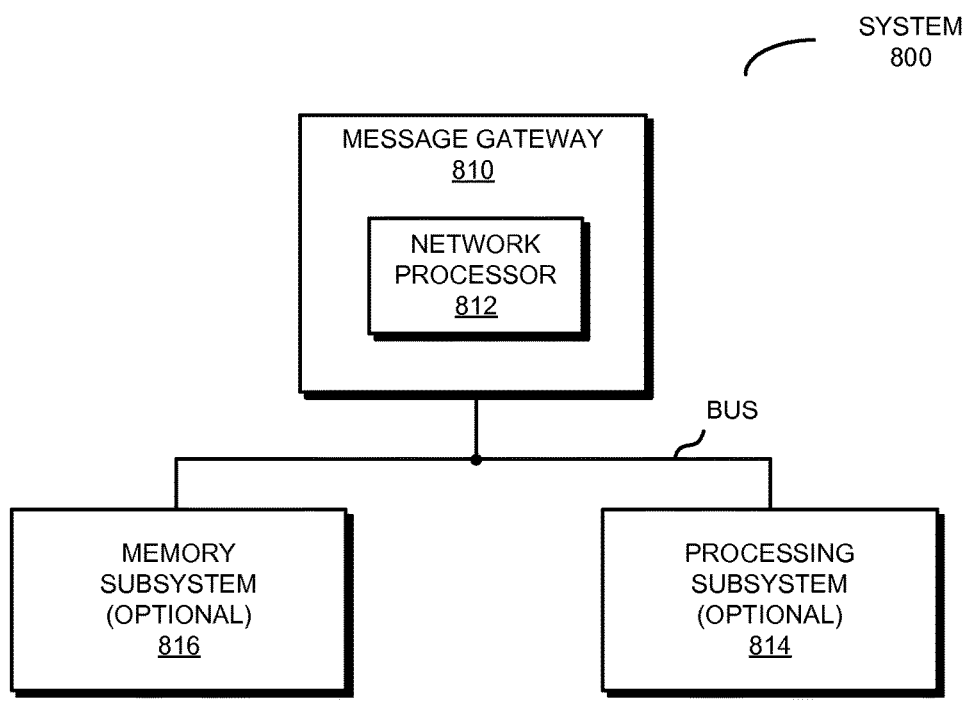
FIG. 8 is a block diagram illustrating a system that includes a message gateway with a network processor in accordance with an embodiment of the present disclosure.

We now describe embodiments of the system. FIG. 8 presents a block diagram of a system 800 that includes message gateway 810 with a network processor 812, which may be one of the preceding embodiments of the network processor (such as network processor 100 in FIG. 1). Furthermore, system 800 may include one or more program modules or sets of instructions stored in an optional memory subsystem 816 (such as DRAM, another type of volatile or non-volatile computer-readable memory, and more generally a memory), which may be executed by an optional processing subsystem 814 (which may include one or more processors). Note that the one or more computer programs may constitute a computer-program mechanism. Furthermore, instructions in the various modules in optional memory subsystem 816 may be implemented in: a high-level procedural language, an object-oriented programming language, and/or in an assembly or machine language. Note that the programming language may be compiled or interpreted, e.g., configurable or configured, to be executed by optional processing subsystem 814.

More generally, embodiments of the network processor and the message gateway may be used in a variety of applications, including communications, high-performance computing, etc. Consequently, the system may include: VLSI circuits, communication systems, storage area networks, data centers, networks (such as local area networks), and/or computer systems (such as multiple-core processor computer systems). Note that system 800 may include, but is not limited to: a server (such as a multi-socket, multi-rack server), a laptop computer, a communication device or system, a tablet computer, a personal computer, a work station, a mainframe computer, a blade, an enterprise computer, a data center, a portable-computing device, a supercomputer, a data center, a network-attached-storage (NAS) system, a storage-area-network (SAN) system, and/or another electronic computing device. Moreover, note that a given computer system may be at one location or may be distributed over multiple, geographically dispersed locations.

The preceding embodiments may include fewer components or additional components. Although these embodiments are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed.

Furthermore, functionality in these circuits, components and devices is implemented in hardware and/or in software as is known in the art. For example, some or all of the functionality of these embodiments may be implemented in one or more: application-specific integrated circuits (ASICs), field-programmable gate arrays (FPGAs), and/or one or more digital signal processors (DSPs). In particular, a hardware implementation of the network processor and/or the message gateway can scale to thousands or millions of input values with latency on the order of microseconds. Additionally, note that circuits in these embodiments may be implemented using PMOS and/or NMOS, and signals may include digital signals that have approximately discrete values and/or analog signals that have continuous values.

Note that components and circuits may be single-ended or differential, and power supplies may be unipolar or bipolar.

In the preceding embodiments, some components are shown directly connected to one another, while others are shown connected via intermediate components. In each instance the method of interconnection, or 'coupling,' establishes some desired electrical communication between two or more circuit nodes, or terminals. Such coupling may often be accomplished using a number of circuit configurations, as will be understood by those of skill in the art (for example, AC coupling and/or DC coupling may be used).

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDSII Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

While the preceding embodiments illustrated the use of the network processor in a message gateway for messages associated with stock transactions, in other embodiments the network processor may be used in other applications. For example, the network processor may be used to process messages in network traffic from a site, a port or a website. Alternatively, the network processor may be used in a data center or for event-driven processing.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A network processor, comprising:
    an input network stack configured to receive messages from an inbound network link;
    a format decoder, coupled to the network stack, configured to: extract one or more fields from a given message; provide the one or more fields to application logic; determine a context for the given message;

provide the given message and the context to a data handler, wherein the context is based on a message type and an identifier of the network connection on which the given message was received; determine a message status for the given message; and provide the message status to the data handler, wherein the message status includes a length of the given message and information specifying any error conditions associated with the given message;

the application logic, coupled to the format decoder, configured to: determine one or more trigger values based on the one or more fields and one or more trigger expressions; and provide the one or more trigger values to the data handler, wherein the one or more trigger expressions include checks on information in a payload of the given message; and the data handler, coupled to the format decoder and the application logic, configured to determine one or more actions to be taken for the given message based on the context and the one or more trigger values, wherein the one or more actions to be taken include whether the given message is forwarded and one or more forwarding destinations, wherein the data handler is further configured to determine the one or more actions to be taken based on the information specifying any error conditions associated with the given message.

2. The network processor of claim 1, wherein the context from the format decoder, the one or more trigger values from the application logic and the message status from the format decoder arrive at the data handler in order.

3. The network processor of claim 1, wherein the application logic is further configured to: determine a logic status based on the one or more fields; and provide the logic status to the data handler; and wherein the logic status includes information specifying any error conditions associated with the application logic.

4. The network processor of claim 3, wherein the data handler is further configured to determine the one or more actions to be taken based on the information specifying any error conditions associated with the application logic.

5. The network processor of claim 1, wherein the network processor further comprises multiple instances of the application logic, coupled to the format decoder and the data handler, configured to process multiple messages in parallel.

6. The network processor of claim 1, wherein the data handler includes a memory in which the context and the one or more trigger values specify an address that points to a memory location with the one or more actions to be taken.

7. The network processor of claim 6, wherein the address is determined by performing a logical operation on values in the context and the one or more corresponding trigger values.

8. The network processor of claim 7, wherein, after the address is determined, the data handler determines the one or more actions to be taken without executing instructions for additional logical operations.

9. The network processor of claim 6, wherein a number of bits in the address is dynamically set when instructions specifying the network processor are compiled.

10. The network processor of claim 1, wherein the one or more forwarding destinations include one of: an output network stack configured to provide at least a subset of the messages to an outbound network link; a message logger; and a processor.

11. The network processor of claim 1, wherein the given message is processed without conditional statements.

12. The network processor of claim 1, wherein the network processor operates at a data rate of the inbound network link.

13. The network processor of claim 1, wherein the context is determined by the format decoder using a look-up table based on the message type and the identifier of the network connection.

14. The network processor of claim 1, wherein the format decoder delivers the one or more fields to the data handler and the application logic delivers the one or more trigger values to the data handler without synchronization.

15. A system, comprising:
a processor; and
a network processor coupled to the processor, wherein the network processor includes:
an input network stack configured to receive messages from an inbound network link;
a format decoder, coupled to the network stack, configured to: extract one or more fields from a given message; provide the one or more fields to application logic; determine a context for the given message; provide the given message and the context to a data handler, wherein the context is based on a message type and an identifier of the network connection on which the given message was received; determine a message status for the given message; and provide the message status to the data handler, wherein the message status includes a length of the given message and information specifying any error conditions associated with the given message;

the application logic, coupled to the format decoder, configured to: determine one or more trigger values based on the one or more fields and one or more trigger expressions; and provide the one or more trigger values to the data handler, wherein the one or more trigger expressions include checks on information in a payload of the given message; and the data handler, coupled to the format decoder and the application logic, configured to determine one or more actions to be taken for the given message based on the context and the one or more trigger values, wherein the one or more actions to be taken include whether the given message is forwarded and one or more forwarding destinations, wherein the data handler is further configured to determine the one or more actions to be taken based on the information specifying any error conditions associated with the given message.

16. A method for processing messages, wherein the method comprises:
using an input network stack in a network processor, receiving the messages from an inbound network link;
using a format decoder in the network processor, performing the operations of:
extracting one or more fields from a given message;
providing the one or more fields to application logic in the network processor;
determining a context for the given message, wherein the context is based on a message type and an identifier of the network connection on which the given message was received;
determining a message status for the given message, wherein the message status includes a length of the given message and information specifying any error conditions associated with the given message; and
providing the given message, the context, and the message status to a data handler in the network processor;

using the application logic, performing the operations of:

determining one or more trigger values based on the one or more fields and one or more trigger expressions, wherein the one or more trigger expressions include checks on information in a payload of the given message; and providing the one or more trigger values to the data handler; and using the data handler, determining one or more actions to be taken for the given message based on the context and the one or more trigger values, wherein the one or more actions to be taken include whether the given message is forwarded and one or more forwarding destinations, wherein the data handler is further configured to determine the one or more actions to be taken based on the information specifying any error conditions associated with the given message.

\* \* \* \* \*